Jan. 10, 1967     J. E. BALLMER     3,297,392
LENS ALIGNMENT MEANS
Filed Jan. 2, 1964

JAMES E. BALLMER
INVENTOR.

BY
ATTORNEYS

United States Patent Office 3,297,392
Patented Jan. 10, 1967

3,297,392
LENS ALIGNMENT MEANS
James E. Ballmer, Chili, N.Y., assignor to Bausch & Lomb Incorporated, Rochester, N.Y., a corporation of New York
Filed Jan. 2, 1964, Ser. No. 335,262
10 Claims. (Cl. 350—178)

This invention relates to a means and a method for aligning an optical element and more particularly to an expandable retainer for an optical element.

Various means and methods have been proposed for aligning an optical element in an optical system. The alignment of the element must be accomplished with ease and yet permanently retain the element once the alignment is made. Alignment elements which are rigid may cause cracking or breaking of the optical element and therefore a resilient seat engaging the lens element and snugly fitting into the support means is desirable.

Assembling one element within a supporting means would not require machining to close tolerances if an expandable spacer were used to expandably fill the space intermediate the element and its supporting means.

Accordingly, it is proposed to use a resilient material having a "memory" characteristic inherent of certain thermal plastic compositions of which examples are polymethyl methacrylate, polystyrene, and cellulose acetate butyrate compounds. The memory characteristic causes the plastic material when heated to a certain temperature to deform and return to its original dimension prior to a deformation by some physical means. The triggering process might be heating of the material, or a chemical reaction causing the deformation or any suitable triggering step in the process of releasing the internal elastic forces.

The more commonly known materials are thermoplastics which have considerable elasticity in which elastic forces can be partially controlled. The plastic material has a heat stable condition in which no internal elastic forces are present in the material. The heat unstable form is such that the material is physically deformed from its stable form to set up internal elastic forces in the material itself. These forces remain in the plastic material until heat is applied upon which the elastic forces in the material overcome the strain in the material and cause a fluid condition and a flow of the material into its original heat stable form. This condition exists when the plastic material is heated above a certain temperature in which the internal elastic forces are greater than the internal rigidity of the material. The heat stable form is irreversible due to application of heat and could be deformed only by a physical deformation such as originally applied. The memory characteristic may be utilized to create radially inward forces on a lens element to align the element centrally on an optical axis.

It is an object of this invention to provide a material having a memory characteristic to fix an element within a supporting means by application of a stress releasing means.

It is another object of this invention to provide a means and a method for aligning optical elements within a supporting means by use of a material having a memory characteristic and to retain said optical elements in the aligned position.

It is a further object of this invention to provide a means and a method for supporting a lens element and radially forcing central alignment of the optical element through radial forces caused by release of internal stress in deformable material.

The objects of this invention are accomplished by providing a supporting means for carrying a lens element. Material having a memory characteristic may be equally spaced at, at least three points about the periphery of the lens intermediate the lens and the inner periphery of the lens supporting means. The material may be a continuous band between the lens and the supporting means; the important feature is that the radial forces equalize and cause a centering of the lens in the supporting means. The material having the memory characteristic is then caused to release the elastic internal forces biasing the lens element to a central alignment within the supporting means. This provides a permanent set for the lens element relative to the supporting means.

Referring to the drawings the preferred embodiment of the invention is illustrated.

Figure 1:
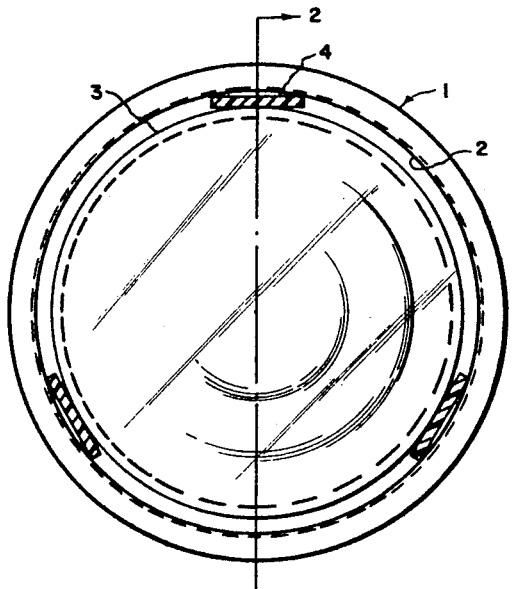
FIG. 1 is a view illustrating three equally spaced and cross sectioned pads positioned intermediate the outer periphery of the lens element and the inner periphery of the supporting means.

The drawings illustrate a means for aligning a lens element within a lens supporting means. The inventor does not wish to limit his invention to a lens element or a circular lens supporting means. Any element not necessarily optical having an outer periphery received within a support means might be aligned or retained with a means similar to that illustrated in the drawings. The drawings also set forth the method by which the lens element is aligned in its supporting means and the means which retain the lens element in this aligned position once the internal forces are released from the material having the memory characteristic.

FIG. 1 illustrates a lens support 1 having an annular recess 2 for reception of a lens 3. The inner periphery of the supporting means 1 is slightly larger than the outer periphery of the lens 3 permitting the insertion of three equalized angularly spaced pads 4.

Figure 2:
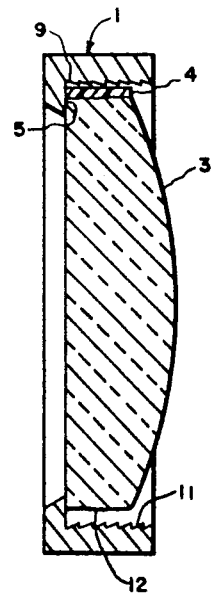
FIG. 2 is a cross section view taken on line 2—2 of FIG. 1.

FIG. 2 illustrates the supporting means 1 which retains a lens element 3 and one of the pads 4. The lens element 3 could be tapered to force the lens element against the radial flange 5 or utilize friction alone for retaining the lens element 3 within the recess of the supporting means 1. The sawtoothed annular grooves 11 are formed to create an axial component of force to firmly seat the lens 3 on the flange 5 as the pads 4 forcibly fill the space intermediate the lens 3 and the support means 1.

Figure 3:
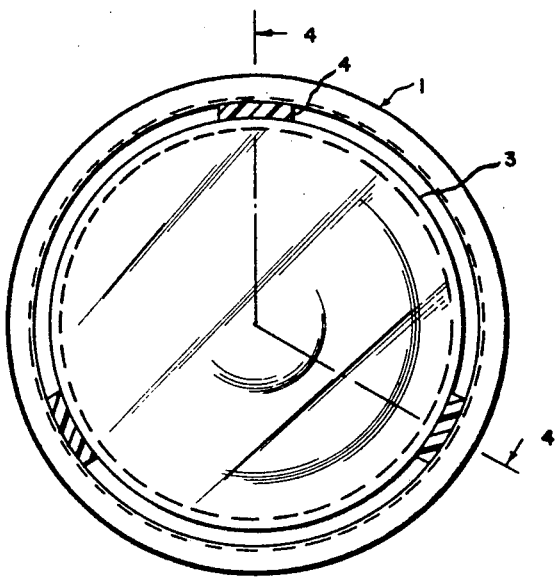
FIG. 3 is a view similar to FIG. 1 subsequent to the release of the internal elastic forces in the material having the memory characteristic.

FIG. 3 illustrates the supporting means 1 carrying the lens 3 subsequent to the release of the internal forces in the pads 4.

Figure 4:
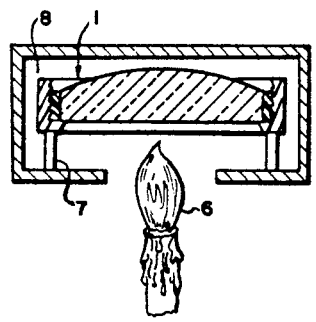
FIG. 4 illustrates a means of releasing the internal forces in the alignment pads with the lens section cut through the pads.

The pads 4 are caused to release their internal forces through one of various means which may be accomplished as illustrated in FIG. 4. This is dependent on the material used in the pads 4. A thermoplastic material which is physically stretched to cause a thinner radial thickness of the pad 4 will expand to fill the radial space between lens element and its support upon application of heat. This may be accomplished as illustrated in FIG. 4 by application of the heat through the flame 6. The lens supporting means 1 carries the lens which is supported on the blocks 7 within the chamber 8 is illustrated although a conveyer operating in a furnace or any other suitable means would work equally as well. The application of heat causes the pads 4 to expand radially centering the lens within the retainer 1 creating an alignment within the retainer. The reversionary action caused by the memory characteristics of the plastic material is non-reversible to the point that any further application of heat will not allow the pads to deform. The only deformation possible would be a physical deformation as initially applied on the material prior to its use in the device as illustrated.

The alignment means or retaining operates in the following described manner. The retainer 1 is bored with a recess 2 having grooves 11 with the inner periphery 2 of a slightly larger diameter than the outer periphery of the lens element 3. The lens element 3 is received within the recess 2 of the lens supporting means 1. The pads 4 are then positioned intermediate the radially inner periphery of the recess 2 and the outer periphery of the lens 3. A limited space 9 remains between the pad and the supporting means and the lens. This facilitates assembling of the lens supporting means with the lens element. The method and means of assembly would adapt itself to any combination of mechanical parts and permit the use of loose fitting tolerances which would be overcome by the expandable spacers.

FIG. 4 illustrates the application of heat of the assembly comprising the lens 3, the lens supporting means 1 and the plurality of pads 4. The pads are equally spaced and of equal size to equalize the force created on the outer periphery of the lens 3. It is imperative that the forces be equal in all directions on the lens element to provide an accurate alignment. Three pads equally spaced at 120° being of the same size provides a cancellation of forces on the lens element which align the lens centrally within the lens supporting means upon application of heat as illustrated in FIG. 4. Upon application of heat as illustrated in FIG. 4 the pads 4 expand to a greater thickness radially and a smaller dimension peripherally on the outer portion of the lens element 3. The roughened surface 12 on the periphery of the lens element 3 and the sawtooth grooves 11 on the support means 1 create an axial component of force firmly seating the lens on the flange 5. The deformation is caused by the internal forces set up in the pads which were prior to their insertion between the lens and the lens supporting means. The release of the internal forces causes an alignment of the lens element in the supporting means which is irreversible and maintains this alignment.

The preferred embodiment of this invention is illustrated and it is understood that other modifications might be made which would fall within the scope of this invention which is defined by the attached claims.

I claim:

1. A method of aligning a lens element in a supporting means comprising placing a lens element within a recess of a rigid lens supporting means, placing thermoplastic material having a memory characteristic intermediate the outer periphery of said lens element and the inner periphery of said lens supporting means, heating the material to release the elastic forces in said material to urge against said supporting means and said lens element to cause said lens element to be aligned centrally within said lens supporting means.

2. The method of aligning a lens within a substantially rigid lens supporting means having a recess greater than said lens comprising placing a lens within the inner periphery of said recess of said lens supporting means, placing at least three unstable plastic pads equally angularly spaced on the outer periphery of said lens and the inner periphery of the recess of said lens supporting means, heating said pads to release the internal forces in said pads to urge against said lens and said support means thereby aligning the lens element in accordance with the shape of the inner periphery of said lens supporting means.

3. The method of aligning a circular lens element having an optical center comprising the following steps, placing said lens element within a circular recess of a substantially rigid lens supporting means, placing a heat unstable plastic material intermediate said lens and said lens supporting means, said material having internal elastic forces tending to deform said pads radially when heated, heating said material and causing the release of the elastic forces in said material thereby increasing the radial thickness of said material to urge against said circular recess and said lens element thereby aligning the lens element optical center in the center of the circular recess of the lens supporting means.

4. A lens and supporting means therefor comprising in combination, a rigid lens supporting means defining a recess, a lens element having a perimeter dimension of lesser magnitude than said recess disposed within said supporting means recess, a plurality of at least three pads of thermoplastic material having a memory characteristic, due to unreleased stress therein, coupled between said lens supporting and said lens element aligning and holding said lens in the recess of said lens supporting means through a force exerted between said lens element and said lens supporting means by substantial release of said stress.

5. A lens and aligning support means therefor comprising in combination, a substantially rigid lens support defining a circular inner periphery, a lens element having an optical center and a circular outer periphery of a lesser dimension than the inner periphery of the recess in said lens support, a thermoplastic material having a memory characteristic due to unreleased stresses therein disposed intermediate said lens element and said lens support aligning the optical center of said lens with said support means inner periphery and supporting said lens element centrally within the recess of said lens support through a force exerted between the inner periphery of said lens support means and the outer periphery of said lens element by substantial release of said stresses.

6. A lens and aligning supporting means therefor comprising in combination, a rigid lens supporting means defining an annular recess having a circular inner periphery, a plurality of sawtooth shape grooves formed on an axial wall of said annular recess, a radial flange forming a wall of said recess, a lens element defining a circular outer periphery of a lesser dimension than the inner periphery of said recess in said lens support engaging said radial flange, a thermoplastic material having a memory characteristic disposed intermediate said lens element and said lens supporting means holding said lens element centrally within the annular recess of said lens supporting means and firmly seating said lens on said radial flange in response to an axial component force created by the reaction of the sawtooth groove in said annular recess.

7. A method of aligning a lens within a substantially rigid lens supporting means comprising, placing a lens within the inner periphery of a recess in said substantially rigid lens supporting means having a sawtooth axial flange and a radial seating flange, placing a deformed heat responsive plastic material having a memory characteristic intermediate said lens and said lens supporting means, heating said material for releasing the internal forces in said material to permit radial expansion for exerting a force between said support means and said lens for aligning said lens in the annular recess of said lens supporting means and firmly seat said lens on said radial flange.

8. A method of aligning an element in a mating substantially rigid supporting means comprising, placing the element within a mating portion of said substantially rigid supporting means, placing a predeformed plastic material having a memory characteristic intermediate the periphery of said element and the mating portion of the supporting means, releasing the elastic forces in said material to exert an urging force between element and support means to fix said element within the supporting means.

9. An element and supporting means therefor comprising in combination, a substantially rigid supporting means defining a recess, an element having a perimeter dimension of lesser magnitude than said recess in said supporting means, a thermoplastic material having a memory characteristic intermediate said element and an inner periphery of the recess of said supporting means urging against said support means and said element to hold said element in said supporting means.

10. An optical element and a supporting means therefor comprising in combination, a rigid supporting means defining an annular recess having grooves formed in the inner periphery of said recess, an optical element having a circular outer perimeter of lesser magnitude than said recess disposed within said recess, and a plurality of thermoplastic pads having a memory characteristic positioned intermediate said rigid supporting means and said optical element engaging said grooves to hold and align said optical element centrally within said recess.

References Cited by the Examiner
UNITED STATES PATENTS

| | | | |
|---|---|---|---|
| 1,461,071 | 7/1923 | Schumacher | 264—230 X |
| 2,027,962 | 1/1936 | Currie | 264—230 |
| 2,423,492 | 7/1947 | Fairbank. | |
| 2,886,853 | 5/1959 | Herman et al. | 264—230 |

ALEXANDER H. BRODMERKEL, *Primary Examiner.*

B. SNYDER, *Assistant Examiner.*